US012567104B2

(12) United States Patent
Thompson et al.

(10) Patent No.: US 12,567,104 B2
(45) Date of Patent: Mar. 3, 2026

(54) HOSPITALITY CONNECTION PLATFORM

(71) Applicant: FlipDog LLC, Boulder, CO (US)

(72) Inventors: Matthew Lance Thompson, Boulder, CO (US); James M. Behmke, Boston, MA (US)

(73) Assignee: FlipDog LLC

( * ) Notice: Subject to any disclaimer, the term of this patent is extended or adjusted under 35 U.S.C. 154(b) by 484 days.

(21) Appl. No.: 17/724,151

(22) Filed: Apr. 19, 2022

(65) Prior Publication Data

US 2022/0335513 A1 Oct. 20, 2022

Related U.S. Application Data

(60) Provisional application No. 63/176,410, filed on Apr. 19, 2021.

(51) Int. Cl.
| | |
|---|---|
| *G06Q 30/00* | (2023.01) |
| *G06Q 10/02* | (2012.01) |
| *G06Q 30/08* | (2012.01) |
| *G06Q 50/14* | (2012.01) |

(52) U.S. Cl.
CPC ............. *G06Q 30/08* (2013.01); *G06Q 10/02* (2013.01); *G06Q 50/14* (2013.01)

(58) Field of Classification Search
CPC .............................................. G06Q 30/06–08
See application file for complete search history.

(56) References Cited

U.S. PATENT DOCUMENTS

| | | | | |
|---|---|---|---|---|
| 11,205,196 | B1 * | 12/2021 | Raviv | ..................... H04L 51/42 |
| 2015/0206072 | A1 * | 7/2015 | Fabris | .................... G06Q 10/02 |
| | | | | 705/5 |
| 2017/0147951 | A1 * | 5/2017 | Meyer | .................... G06Q 50/14 |
| 2018/0053121 | A1 * | 2/2018 | Gonzalez | ............... G06Q 30/02 |

OTHER PUBLICATIONS

An, J., Zhao, S., and Lu, X., "A two-stage multiple-factor aware method for travel product recommendation", Multimedia Tools and Applications 77.21: 28991-29012, Springer Nature B.V. (Nov. 2018) (Year: 2018).*

Dawit, H., "Mega Travel Management Company Apps", Business Travel News 36.8: 23-24, Emerald Expositions LLC (Jun. 10, 2019) (Year: 2019).*

* cited by examiner

*Primary Examiner* — Ethan D Civan

(74) *Attorney, Agent, or Firm* — Lee & Hayes, P.C.

(57) ABSTRACT

The techniques herein are directed generally to a hospitality connection platform that connects travel consumers with resorts, hotels, vacation rentals, and destinations in a collaborative manner to create a dream booking and travel experience. In one embodiment, a device of a hospitality connection service maintains a traveler profile for a user that comprises travel preferences and travel history data for that user. The device predicts, based on the traveler profile, trip parameters for a recommended trip for the user and an associated likelihood of the user booking the recommended trip. The device obtains bids from a plurality of systems associated with potential destinations for the recommended trip for the user, in part by sending the trip parameters and the associated likelihood to the plurality of systems. The device provides one or more of the bids from the plurality of systems associated with the potential destinations for display to the user.

20 Claims, 12 Drawing Sheets

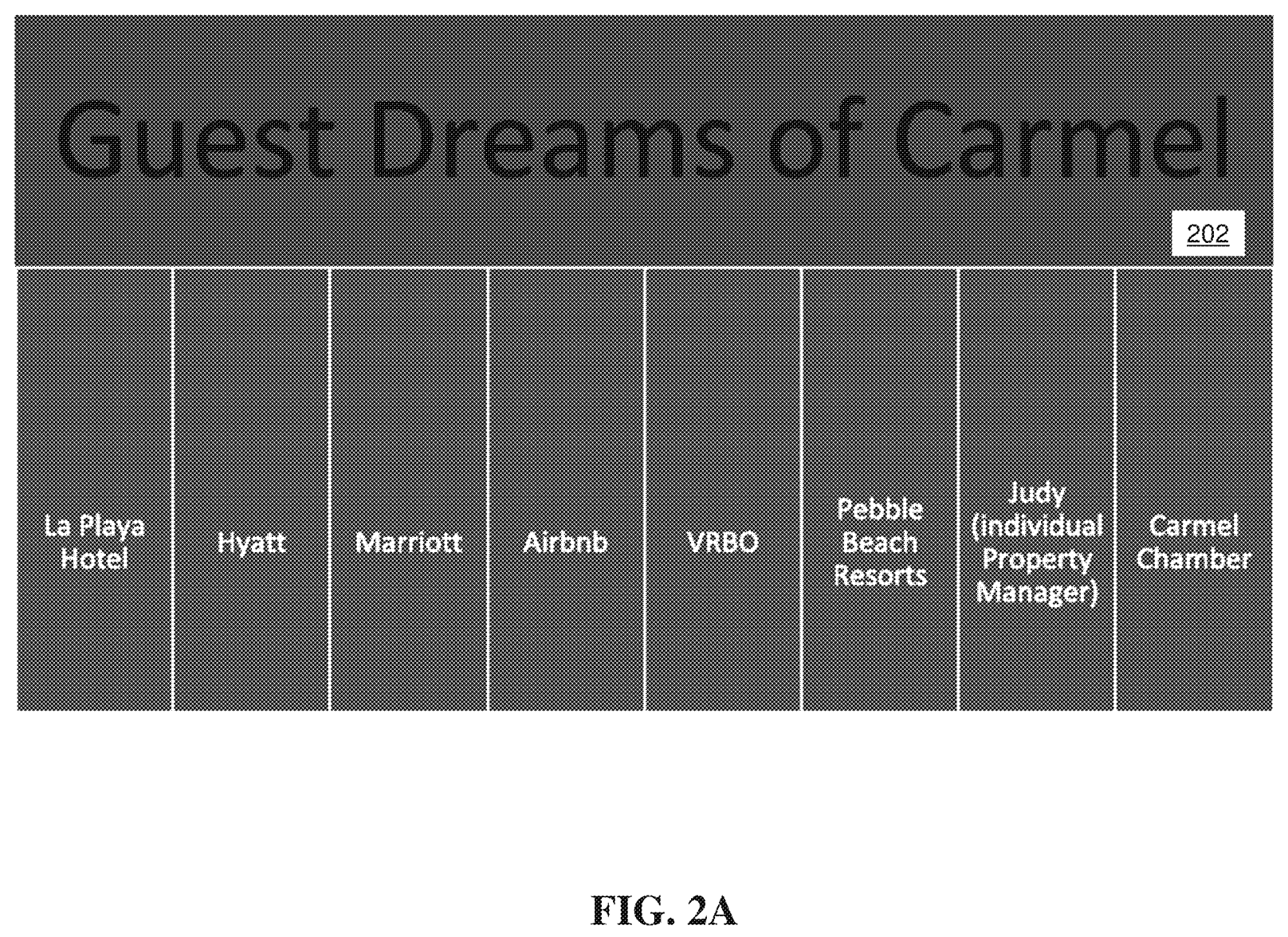

Guest Dreams of Carmel

202

| La Playa Hotel | Hyatt | Marriott | Airbnb | VRBO | Pebble Beach Resorts | Judy (Individual Property Manager) | Carmel Chamber |

FIG. 2A

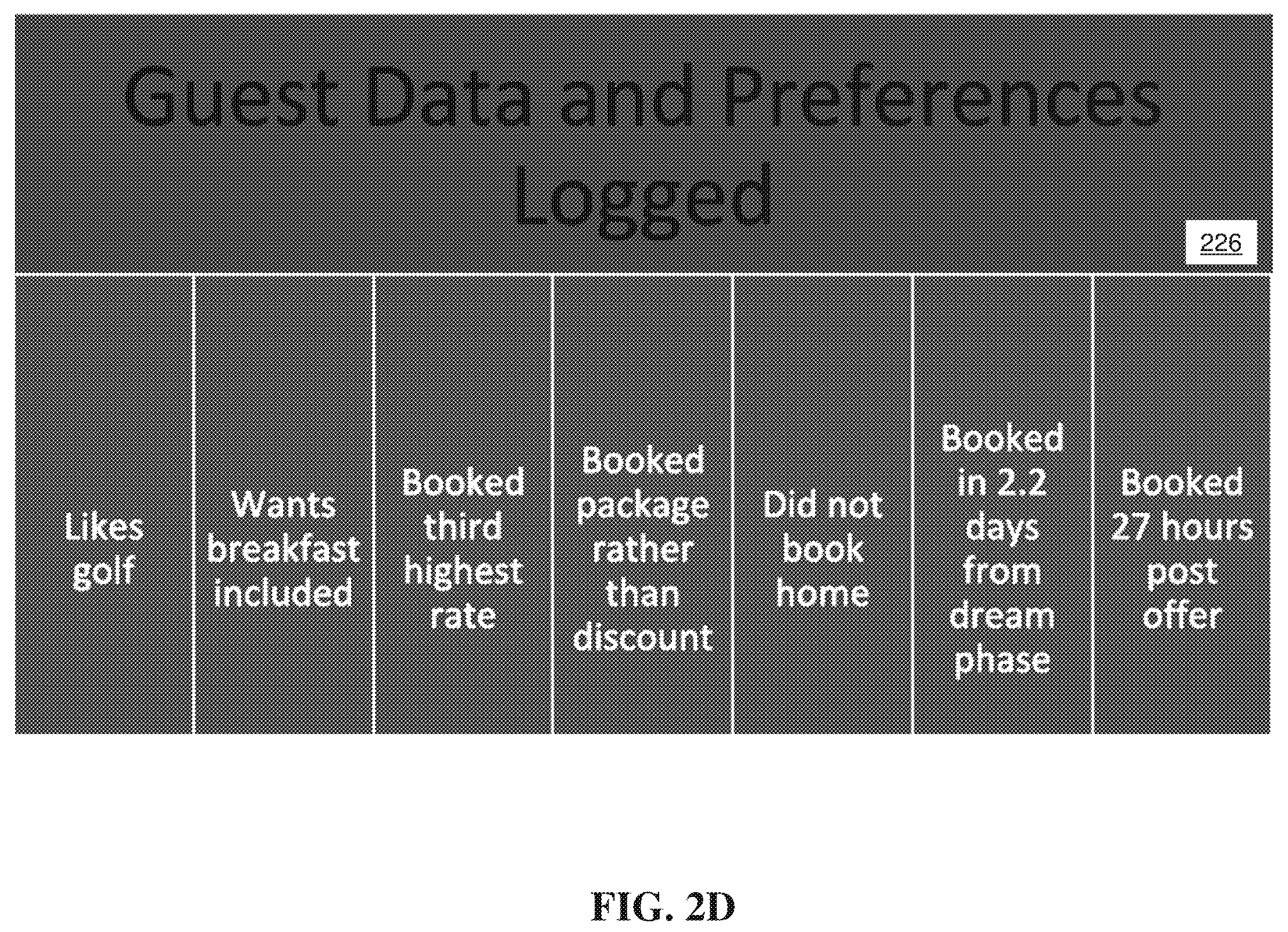

Guest Data and Preferences Logged

226

| Likes golf | Wants breakfast included | Booked third highest rate | Booked package rather than discount | Did not book home | Booked in 2.2 days from dream phase | Booked 27 hours post offer |

FIG. 2D

Figure 2E:
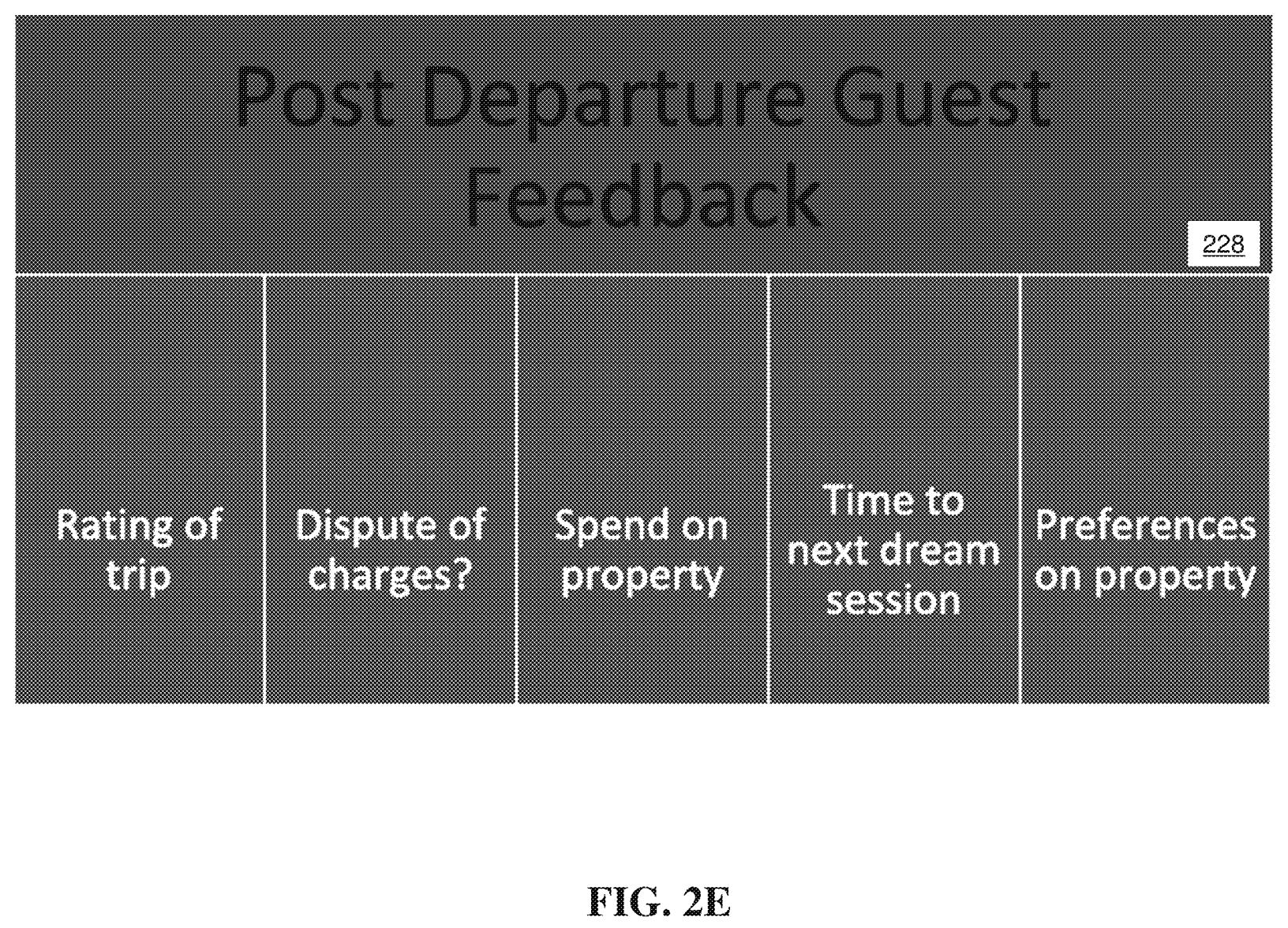

Post Departure Guest Feedback

228

| Rating of trip | Dispute of charges? | Spend on property | Time to next dream session | Preferences on property |

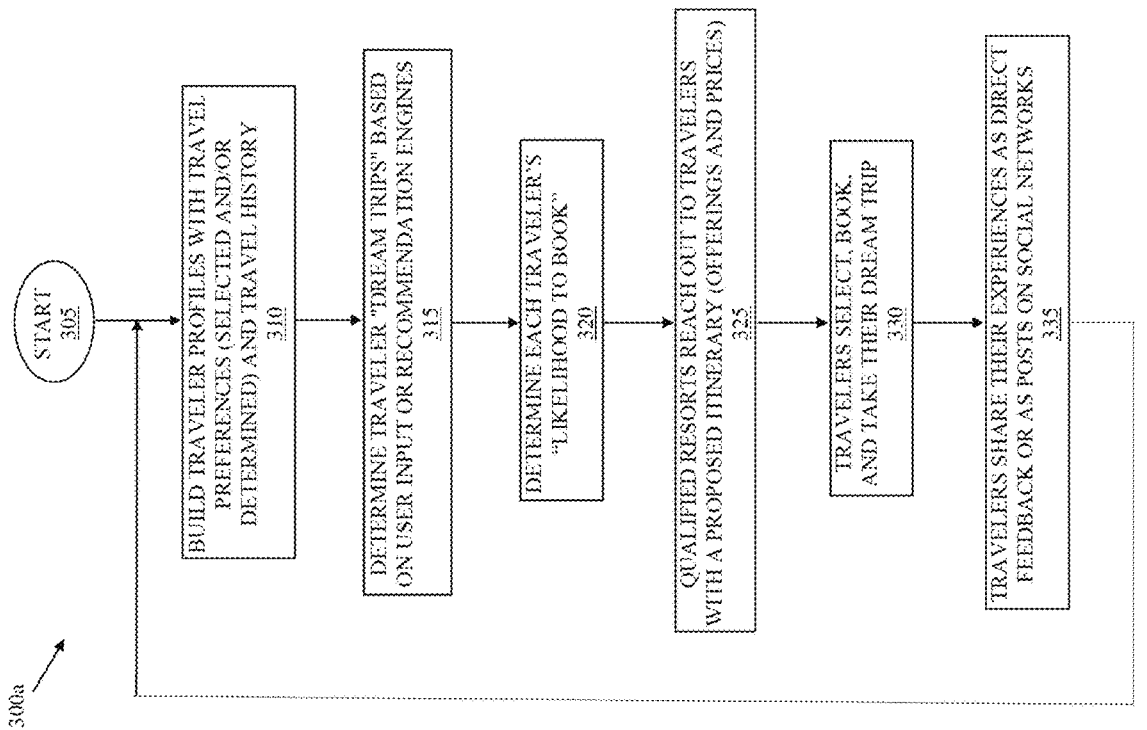

START
305

BUILD TRAVELER PROFILES WITH TRAVEL PREFERENCES (SELECTED AND/OR DETERMINED) AND TRAVEL HISTORY
310

DETERMINE TRAVELER "DREAM TRIPS" BASED ON USER INPUT OR RECOMMENDATION ENGINES
315

DETERMINE EACH TRAVELER'S "LIKELIHOOD TO BOOK"
320

QUALIFIED RESORTS REACH OUT TO TRAVELERS WITH A PROPOSED ITINERARY (OFFERINGS AND PRICES)
325

TRAVELERS SELECT, BOOK, AND TAKE THEIR DREAM TRIP
330

TRAVELERS SHARE THEIR EXPERIENCES AS DIRECT FEEDBACK OR AS POSTS ON SOCIAL NETWORKS
335

FIG. 3A

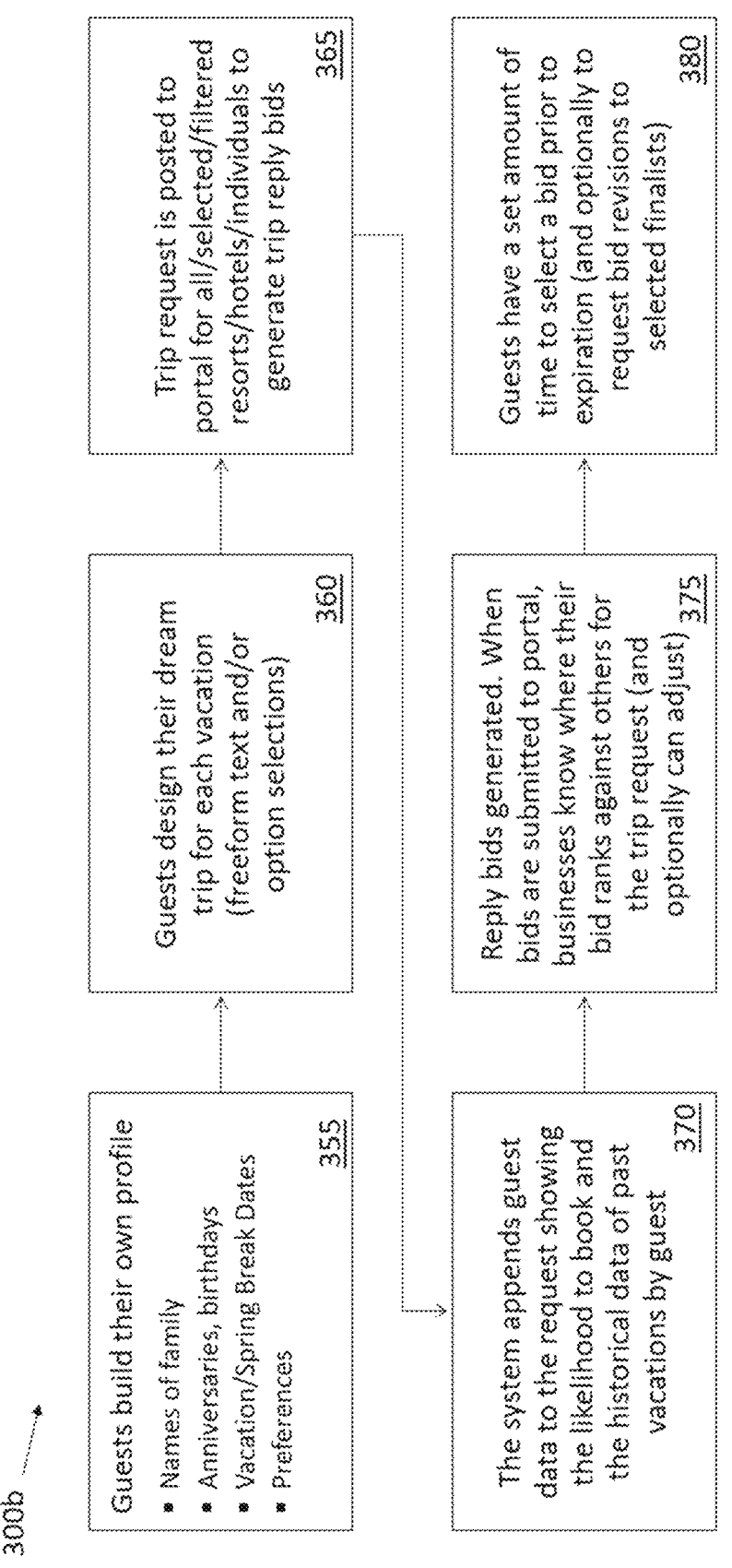

FIG. 3B

Guests build their own profile
• Names of family
• Anniversaries, birthdays
• Vacation/Spring Break Dates
• Preferences
355

Guests design their dream trip for each vacation (freeform text and/or option selections)
360

Trip request is posted to portal for all/selected/filtered resorts/hotels/individuals to generate trip reply bids
365

The system appends guest data to the request showing the likelihood to book and the historical data of past vacations by guest
370

Reply bids generated. When bids are submitted to portal, businesses know where their bid ranks against others for the trip request (and optionally can adjust)
375

Guests have a set amount of time to select a bid prior to expiration (and optionally to request bid revisions to selected finalists)
380

300b

HOSPITALITY CONNECTION PLATFORM

RELATED APPLICATIONS

This application claims priority to U.S. Provisional Application No. 63/176,410, filed on Apr. 19, 2021, entitled "HOSPITALITY CONNECTION PLATFORM," by Thompson et al., the contents of which are incorporated herein by reference in their entirety.

TECHNICAL FIELD

The present disclosure relates generally to hospitality applications, and, more particularly, to a hospitality connection platform.

BACKGROUND

The current traveler is more than a simple vacationer. They are dreamers, visionaries, explorers, and the creators of memories for their families and friends. Planning the "perfect" vacation is an art form, but not only because each trip is specifically tailored to each travel group, their specific goals and desires, and their specific desirable travel periods. In addition to such unique and individualized customizations, travel planning today is based on users having a plethora of available booking channels, where navigation of the options is time consuming and frustrating to the traveler, particularly due to limitations in search functionality in current online booking systems.

Moreover, travel booking is also difficult from the perspective of guest acquisition for hotels, destination management companies (DMCs), cruise lines, event coordinators, tour companies, rental by owner (RBO) platforms, and so on. Guest acquisition activities have traditionally involved spending money on sales and marketing into directed markets based on demographics using such things as advertisements (print, online, television, etc.), search engine keyword searches, social media profiling, email lists, re-booking services (e.g., "last minute" availability, discount booking sites, etc.), strategic partnerships (e.g., credit card deals, travel agencies, rewards programs, etc.), and many other methodologies to gain the attention from potential travelers. However, each of these mechanisms is limited in its capabilities to truly connect with travelers, particularly when their likelihood to book is completely unknown to begin with.

SUMMARY

The techniques herein are directed generally to a hospitality connection platform that connects the travel consumer with resorts, hotels, vacation rentals, and destinations in a manner in which the power and control is in the hands of both parties as they collaborate to create the dream experience. Specifically, in one embodiment, traveler profiles may be built with travel preferences (selected and/or determined) and travel history, and traveler "dream trips" may be determined based on user input or recommendation engines. The techniques herein then determine each traveler's likelihood to book, so that qualified resorts may reach out to travelers with a proposed itinerary (offerings and prices), accordingly. The travelers may then select, book, and take their dream trip, and can share their experiences as direct feedback or as posts on social networks. Embodiments herein then have the capability to continue to update traveler profiles based on the determined behavior or user modification of preferences, generating further booking connections for dream trips, and so on.

Other embodiments of the present disclosure may be discussed in the detailed description below, and the summary above is not meant to be limiting to the scope of the invention herein.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 2A-2E illustrate an example flow of hospitality connection platform according to one or more embodiments herein;

FIGS. 3A-3B illustrate example high-level procedures for operation of a hospitality connection platform in accordance with one or more embodiments described herein;

DESCRIPTION OF EXAMPLE EMBODIMENTS

As noted above, travelers have become more sophisticated over the years, and planning the "perfect" vacation is based on specifically tailored criteria. However, the truly individualized needs of each traveler, as well as the large number of available booking channels, make it difficult for hospitality providers to manage their guest acquisition budgets and expectations, particularly where current search engines are limited in their search functionality to only the most basic information (e.g., city/state, number of beds, date ranges, pool, ocean front, etc.). Guest acquisition has thus been traditionally limited to basic sales and marketing techniques to draw attention to availability, but connecting with travelers is still based on the mere hope that an appropriate user is reached, and then further whether that particular user would book a specifically offered trip/experience. Meanwhile, would-be travelers are often met with a frustrating travel search experience, where it takes too long to sort through options, or else it is too difficult to determine what is actually available, when something is actually available, what amenities or packages are available, etc.

Even if a user is specifically searching through available options on a hospitality website (e.g., hotels, rental by owner (RBO), experiences or excursions, and so on), it is difficult to understand, and thus capitalize on, the ultimate mindset of the user, such as whether they are merely browsing or serious about booking, looking for specific amenities and/or activities, and perhaps more importantly, whether this particular potential traveler is worth trying to reach in the first place with limited budgets (both time and money) based on their specific likelihood to book overall.

Moreover, the travel industry is experiencing a renaissance as it struggles to adapt to today's travelers who dream of adventure, unique experiences, and creating memories to share. In particular, today's traveler has driven: a drastic increase in variety of bookable options; explosive growth of travel review sites; and a rapid rise of the "on-demand beds" and rentals by owner (RBO) channels. In addition, many new technologies have been established to identify "likely to book behavior" of travelers. However, there is still no scalable direct connection between travelers and destination operators.

The techniques herein, therefore, provide a hospitality connection platform that connects the travel consumer with resorts, hotels, vacation rentals, and destinations in a manner in which the power and control is in the hands of both parties as they collaborate to create the dream experience. That is, as described below, the techniques herein will disrupt the travel industry by creating a direct connection between travelers who are highly likely to book and sellers looking to fill vacancies.

Figure 1A:
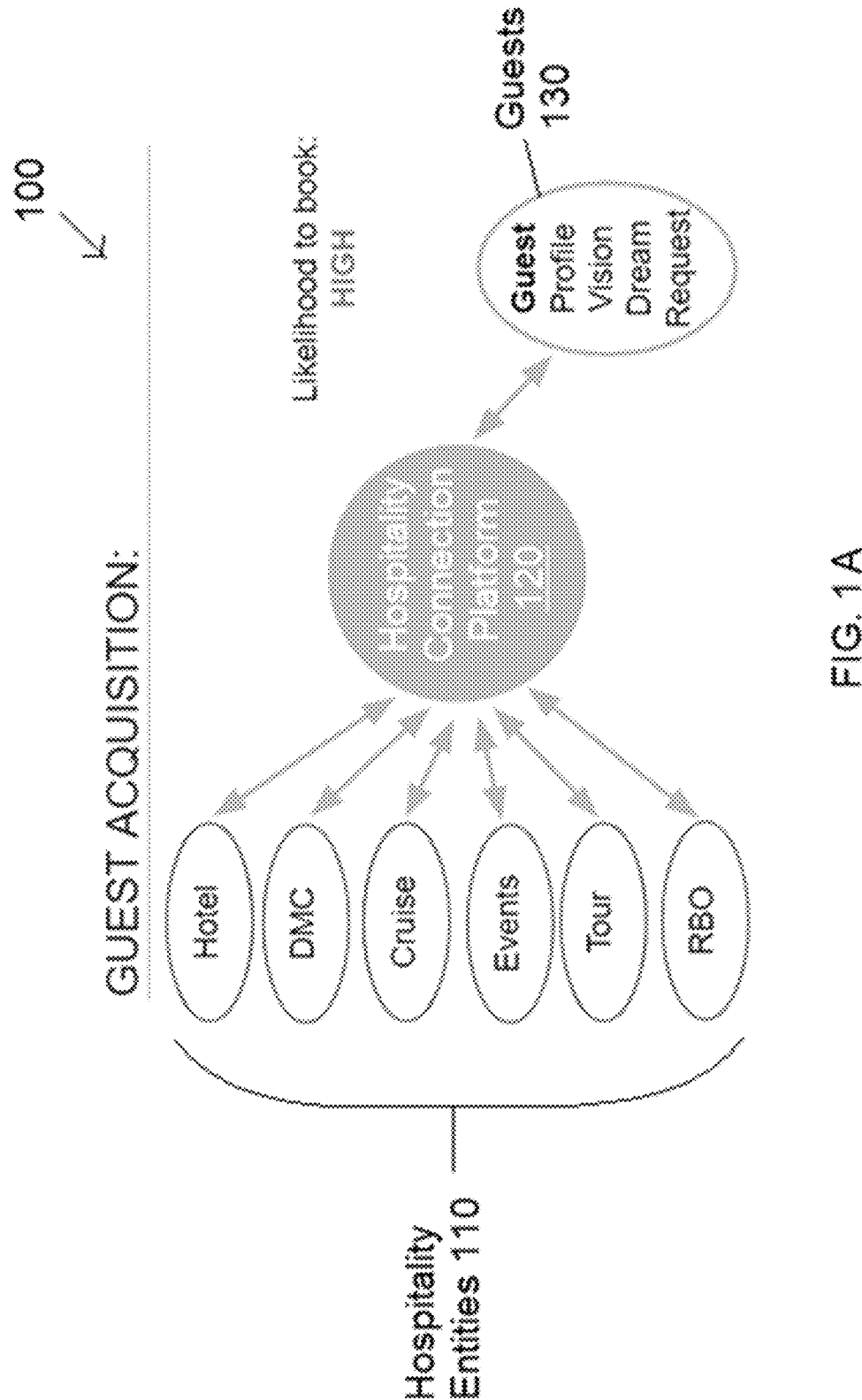
FIGS. 1A-1B illustrate an example hospitality connection platform according to one or more embodiments herein.
Figure 1B:
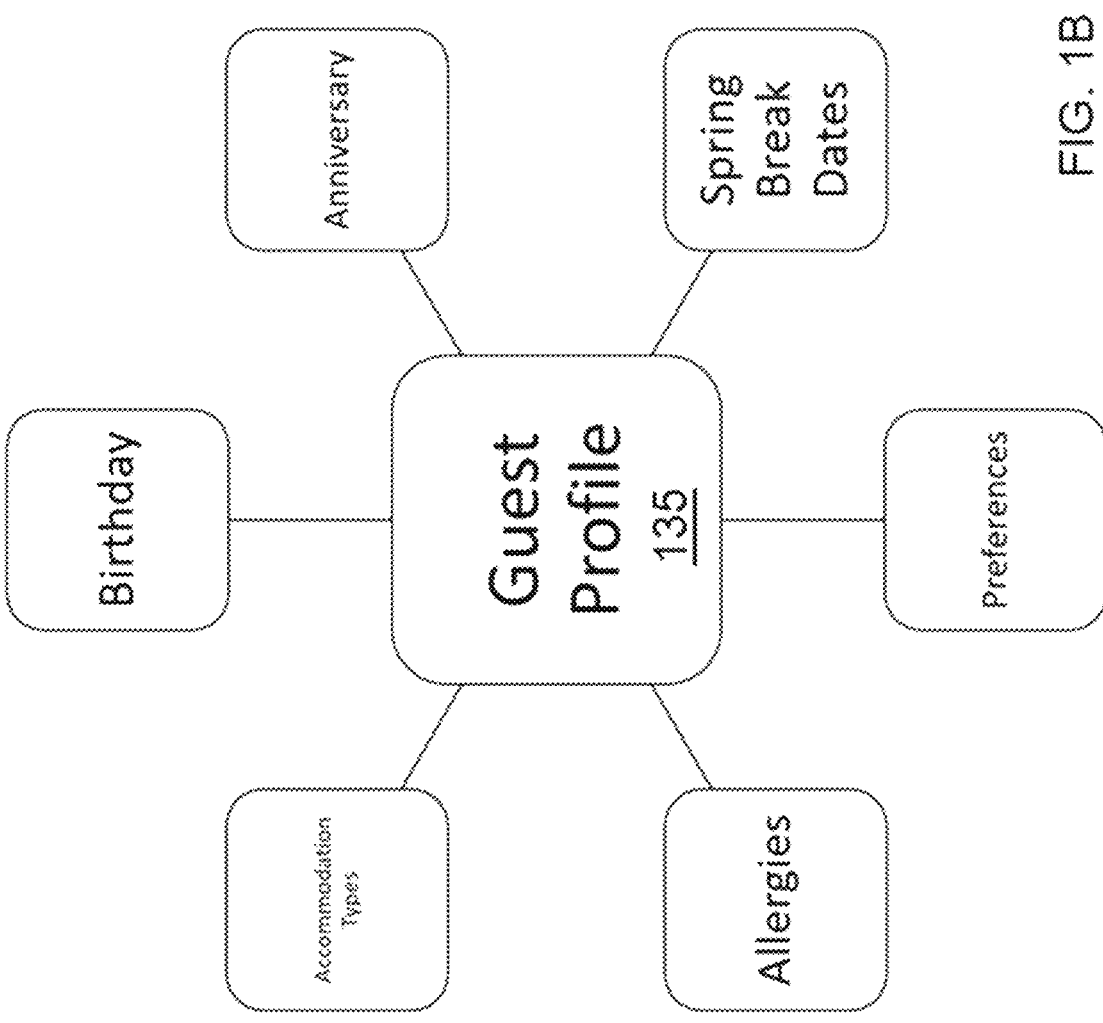

FIG. 1A illustrates a high-level representation of a system 100 in accordance with one or more embodiments of the present disclosure. Namely, various hospitality entities 110, such as hotels, destination management companies (DMCs), cruise lines, event coordinators, tour companies, rental by owner (RBO) platforms, and so on (e.g., entertainment venues, ticket sales, excursion/expedition providers, etc.) may coordinate with the hospitality connection platform 120 (e.g., a distribution platform, database, server, recommendation engine, etc.), in order to reach various guests 130, each with his or her own profile (e.g., vision, dreams, requests). For instance, as shown in FIG. 1B, a guest profile 135 may comprise information such as accommodation type preferences, birthdays, anniversaries, spring break dates, allergies, and other preferences or information. As described in further detail below, the techniques herein may be used to harmonize the needs of both sides of the hospitality connection platform 120 to result in a high likelihood of booking, particularly based on the combination of specific guest profiles, custom guest requests, and hospitality entity capabilities and responsive offerings.

According to one or more embodiments of the present invention, the hospitality connection platform herein may be implemented as an application ("app"), website, or other user-facing interface (e.g., social media platforms, etc.), and is a place for users (e.g., travelers, guests, patrons, etc.) to dream, plan, and book experiences. As described below, each user may be associated in the platform with various preferences, statistics, demographics, personal information, and other factors that may assist both the user in their memorable journeys (e.g., not having to re-enter information, to help the user find suitable experiences/vacations, etc.), as well as the hospitality entities or agents/experts in offering various packages, incentives, and so on to increase their revenue streams. The hospitality connection platform is thus a connector for the global travel community, where dream trips are inspired, planed, booked, and shared.

Figure 2B:
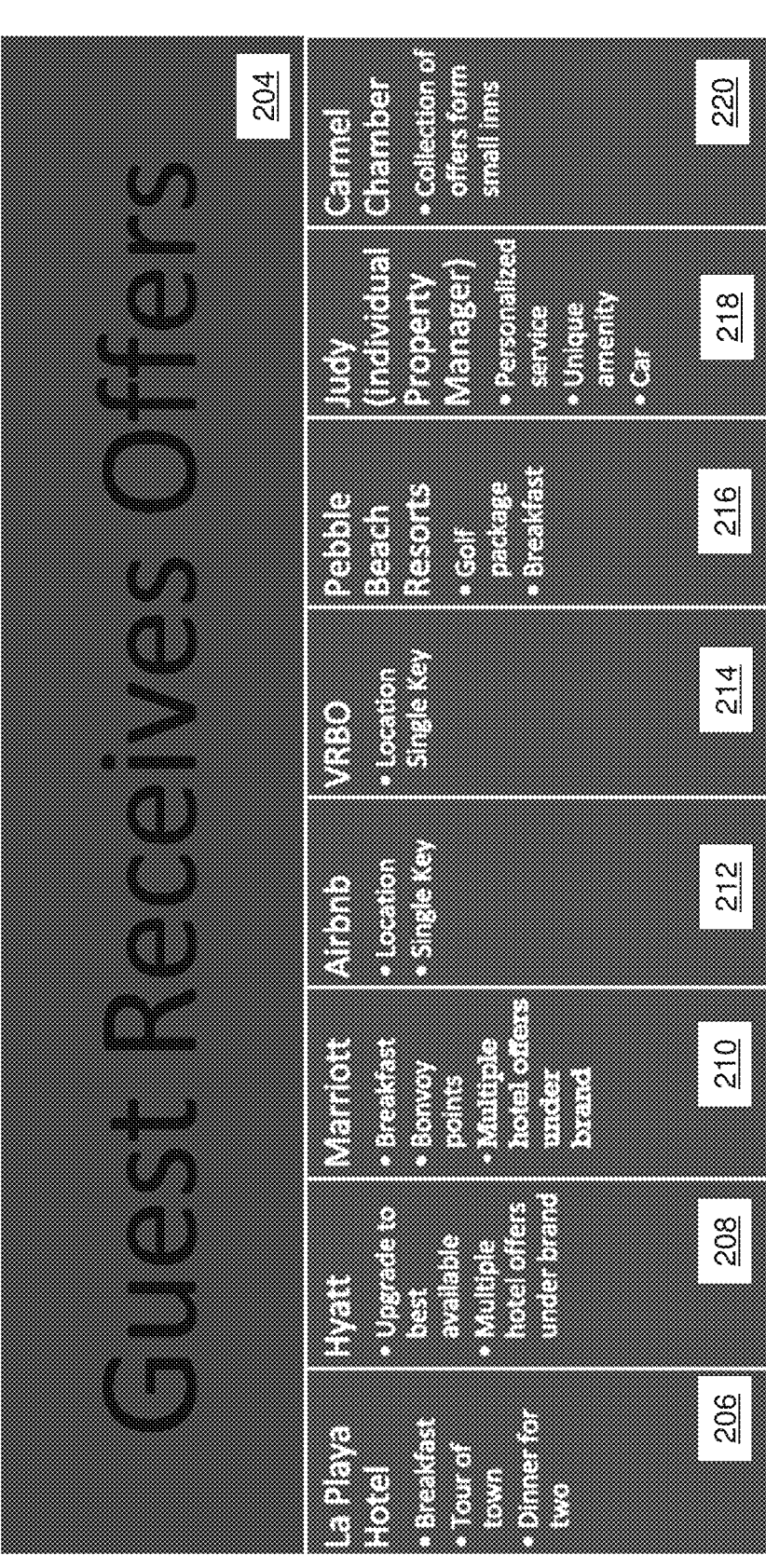

FIGS. 2A-2E illustrate an example flow of the hospitality connection platform herein. For example, as shown in FIG. 2A, assume that a particular guest dreams of a vacation to Carmel, California for a golf vacation. Various potential hospitality entities may have locations in or near Carmel, such as La Playa Hotel, Hyatt, Marriott, Airbnb, VRBO, Pebble Beach Resorts, an individual property manager named "Judy", and the Carmel Chamber of Commerce. After entering some search criteria and/or preferences 202 (e.g., the location, the dates, and so on), the hospitality entities associated with the platform that have availability meeting the guest's requests may then return offers to attempt to entice the guest to select and book their location. For instance, as shown in FIG. 2B, example offers 204 may include:

La Playa Hotel 206:
      Breakfast;
      Tour of the town; and
      Dinner for two.
   Hyatt 208:
      Upgrade to best available room; and
      Multiple hotel offers/locations under brand.
   Marriott 210:
      Breakfast;
      Loyalty rewards points (e.g., "Bonvoy"); and
      Multiple hotel offers/locations under brand.
   Airbnb 212:
      Unique locations; and
      Single Key access.
   VRBO 214:
      Unique locations; and
      Single Key access.
   Pebble Beach Resorts 216:
      Golf package; and
      Breakfast.
   "Judy" 218:
      Personalized service;
      Unique amenities; and
      A car loaner.
   Carmel Chamber 220:
      A collection of offers from small inns in Carmel.

Figure 2C:
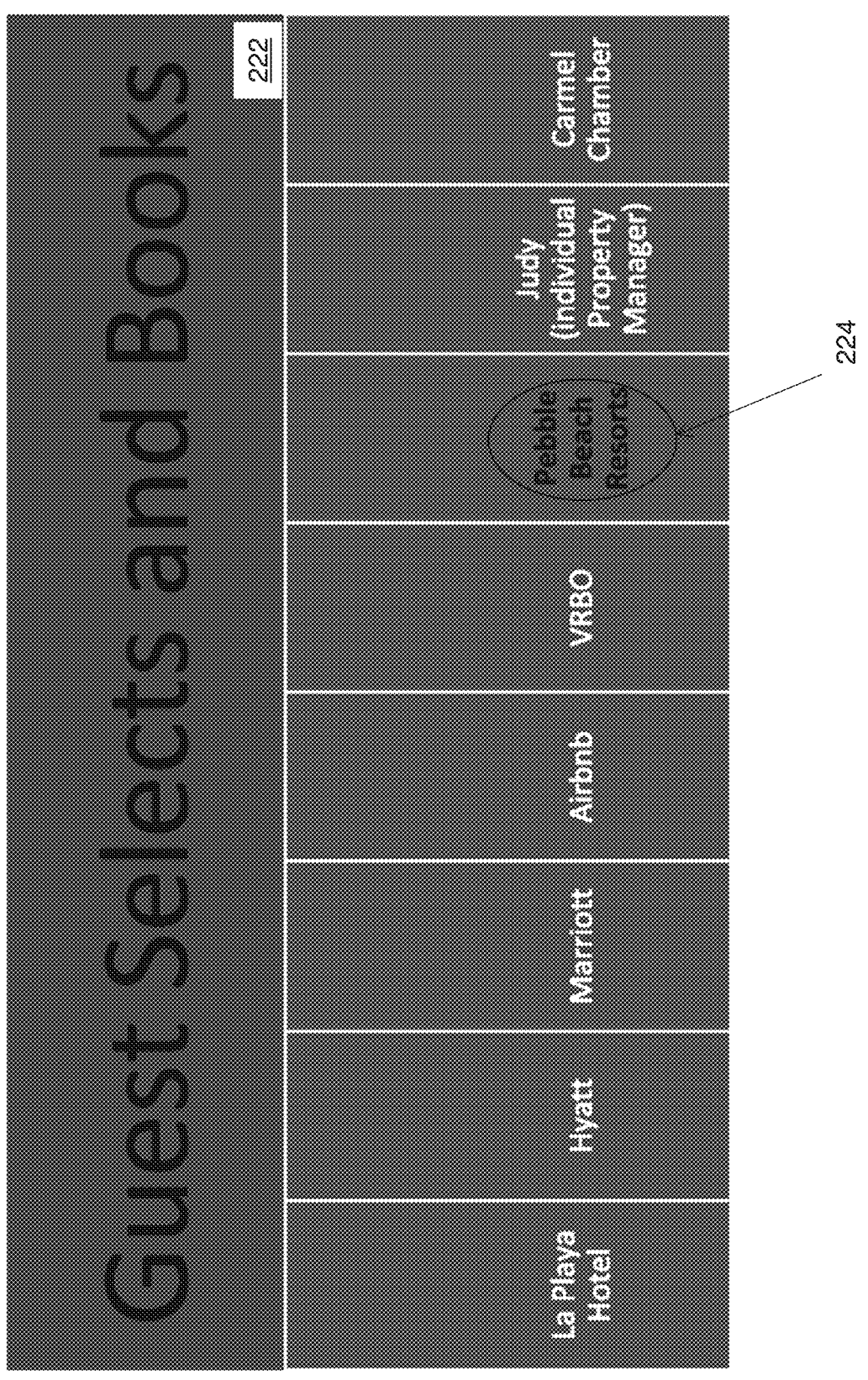

As shown then in FIG. 2C, after reviewing the options on the platform, the guest may make a particular selection 222, as shown as a selection 224 (e.g., Pebble Beach Resorts). The guest data and preferences 226 may then be logged, as shown in FIG. 2D.

For instance, it may be noted by the platform that this particular user:
   likes golf;
   wants breakfast included;
   booked the third-highest rate;
   booked a package rather than a discount;
   did not book a home;
   booked in 2.2 days from the initial "dream phase"; and
   booked 27 hours post offer.
Other information may also have been stored, such as number of times certain offers were expanded or clicked on, number of times the guest revisited certain offers, which offers were potentially debated the most, and so on. In addition, this information may be added to other information from past trips by the guest, such as to offer learned behaviors or statistics, such as "does not book a home 90% of the time" or "breakfast may not be a factor in selection" or "books a golf trip every April to Carmel", and so on.

As shown in FIG. 2E, various post departure guest feedback 228 may also be collected, such as ratings of the trip, whether there were any disputed charges, how much the guest spent on the property, the anticipated time until the next "dream session" (pre-booking search phase), and any other determined preferences while on the booked property (e.g., room service, restaurant usage, spa usage, room service preferences, and so on).

Notably, countless use cases exist for the platform described herein, where different types of travel may have different associated desires and offers. As some examples:
   Family Vacations may involve offers relating to:
      Kids activities;
      Value;
      Packaging
      Etc.
   Anniversary trips may involve offers relating to:
      "Hero" bookings;

Repeat dates;
Turnkey responses;
Etc.
Business Travel may involve offers relating to:
    Simplicity of proximity;
    Transportation;
    Breakfast;
    Points;
    Meeting space;
    Etc.
Weddings may involve offers relating to:
    All inclusive;
    Space available rates and cut of times;
    Anniversary return included;
    Photography packages;
    Etc.
Guys'/Girls' Trips may involve offers relating to:
    Golf/Spa inclusive;
    Butlers;
    Etc.
Company Offsites may involve offers relating to:
    Team building events;
    Meeting space;
    Activities;
    Etc.
Ski Trips may involve offers relating to:
    Passes;
    Equipment;
    Transportation;
    Meal experiences in room or on mountain;
    Etc.
College Travel may involve offers relating to:
    Greek events;
    Club travel;
    College athletics;
    Etc.

In further detail, FIG. 3A illustrates an example high-level procedure for operation of a hospitality connection platform in accordance with one or more embodiments described herein. For example, a non-generic, specifically configured device may perform procedure 300a by executing stored instructions (e.g., a process, application, etc.). The procedure 300a may start at step 305, and continues to step 310, where traveler profiles may be built with travel preferences (selected and/or determined) and travel history. For example, as part of the illustrative platform herein, users may submit various information related to travel and booking, such as the name, age, and gender of the user, his or her spouse, his or her children, his or her friends, and so on. Other information may include such things as home address or city/state, nearest airport, language(s) spoken, passport information, vaccination information, etc. Users may also make multiple profiles or sub-profiles, such as an individual profile, a family profile, a profile for travel specifically with children or without children, a profile for certain groups of friends, a business travel profile, an adventure trip profile, a relaxation trip profile, and other types of profiles and/or sub-profiles as appropriate.

Other types of filters or preferences may be entered into a traveler profile, such as general types of vacations or activities (e.g., tropics, golf, no flights, adults only, all inclusive preferred, etc.), typical budgets (e.g., maximums, a tiered scale such as "$-$$$$", etc.), loyalty reward programs, whether or not the traveler is open to being contacted with last-minute deals or availability or generally to being contacted when not specifically searching for a trip (e.g., at any time, only if the offering meets certain criteria, etc.), and other types of information that may be entered or otherwise populated as described herein. Still further information may include travel restrictions (e.g., based on vaccinations, pandemic "hot spots", fear of civil unrest or uprisings), recent travel locations (and whether repeat travel is desired or to be avoided), completion-based check lists (e.g., all 50 of the United States, a certain listing of international countries or landmarks, etc.). The lists of data types mentioned herein is not meant to be limiting, and is merely an example of possible information that may be stored within a user's profile(s). Also, while a user may modify their information over time, so too may the platform's backend tracking and/or recommending engines, as described in greater detail below.

In step 315, the illustrative hospitality connection platform herein may determine a traveler "dream trip" based on user input or based on recommendation engine suggestions. For instance, in a first embodiment, travelers can define their dream trips (that is, their desired criteria for travel) in their own language (e.g., translating the criteria through a backend service of the platform), and can include any number of details such as desired locations, dates, activities, accommodation types, itinerary styles, and so on. While in one embodiment the criteria may be selected based on a checklist, other types of entries may be utilized, such as free-form text for manual reading by an administrator of potential hospitality entities, or for automatic natural language processing (NLP) to convert the text data into intelligent entries for the platform's algorithms. In any of these embodiments, the simplicity of a traveler being able to present their dream in their own language and words, and then having a resort or other hospitality entity reach back to the user with the details and price, creates an increased level of comfort and security driving the likelihood to book, described below.

As an example, and non-exhaustive list, dream trips may be based on any number of the following data points, among any others that may also be useful in defining a dream trip herein:
    location (specific city, general type of location, general country, etc.);
    distance to specific location (e.g., time or miles);
    date ranges (specific dates, date ranges, date exceptions, seasons, etc.);
    length of stay;
    number of people (or number of beds/rooms);
    ages of people;
    type of accommodation or hospitality entity (e.g., hotel, resort, private home, all-inclusive, etc.);
    Children considerations (kids welcome, kid friendly, no kids allowed, babysitting offered, etc.);
    limitations/accessibility (e.g., wheelchair accessible, passport not required);
    travel considerations (e.g., I can/cannot fly, I prefer to drive, I need a car, I am looking for a private jet, I have my own private jet, etc.);
    budget (e.g., exact ranges or maximums, general ranges such as "$-$$$$", etc.);
    language(s) (e.g., must speak certain language, need not speak native language, etc.);
    specific location considerations (e.g., on/near beach, waterfront, on-site parking, etc.);
    climate (e.g., tropical, cold weather cabin, etc.);
    features/amenities (e.g., hot tub, pool, gym, spa, kitchens, laundry, etc.);
    specific activities (e.g., golf, scuba, yoga, sporting events, concerts, shows, etc.);

adventures/excursions offered (e.g., tours, zip lining, safaris, etc.);

services offered (e.g., translators, butlers, housekeeping, room service, etc.);

pet policies (e.g., allows specific type(s), does not allow pets, etc.);

other features (e.g., require a boat dock on a lake, require snowmobile access, etc.);

and so on.

Accordingly, the plethora of options may be listed on an interface of the hospitality connection platform (e.g., as check boxes, radio buttons, field entry, etc.), or a traveler may simply enter free-form text into an entry field for review by the receiving hospitality entities and/or for processing by the platform herein. For example, in addition to, or as an alternative to, selecting certain criteria above, a traveler may free-form enter dream trip descriptions such as:

"I am planning a tenth anniversary trip for my wife and I, leaving our kids at home, and we want nothing more than a quiet beach-front room in a warm climate, a couples massage, and a good restaurant for a long weekend."

"Looking to golf near Carmen, California this spring for a few days. Two people. Would like a car from/to the airport. Can't travel the third week of May, and prefer Thursdays through Mondays."

"Hello! I can't wait to finally go to Hawaii and I've decided now is the time in my life when I just need to bite the bullet and do it! Please help make it an amazing experience for me!"

"Lake trip. Northern New England. Summer 2022. Need a dock for my boat. At least two bedrooms. Two baths preferred, but not necessary. Bringing my dog. Do not include offers for flights, meals, spas, excursions, etc."

"Help! We are trying to find a location to accommodate our two families, with four adults and 7 total children, ages 1-14, for this coming Spring Vacation from April 17-24, someplace in the Myrtle Beach area. We will be flying in so will probably need a van or something to pick us up from the airport. Everything is booked already, and we can't use a hotel since we can't be in separate locations from the kids. Babysitting services a plus! Thanks!"

And any other natural-language based entry.

From here, the platform may pull key words from the language for entry into search algorithms, or may present the language as-is to the hospitality entities for their own offering logic/algorithms. Note that in in one embodiment, additional information may be further requested by either the platform or the hospitality entities, such as information not included in the selections above that may be necessary to make a determination, such as, e.g., "how many guests/rooms?" or "particular date ranges?" or "any children?" (e.g., for an adults-only resort), and so on, which may be necessary to determine availability, or to offer the best possible package. Also, in one embodiment, search criteria may be entered as "must have" or "would prefer" or "must not have" or any scale of desire therein (e.g., a scale of 0-10, with 0 being "cannot have" and 10 being "must have", with a score of 5 indicating a neutral stance on the particular criteria).

Notably, in another embodiment as described further herein, unsolicited dream trip suggestions may be created by the platform herein based on generated recommendations, or else by the hospitality entities based on information obtained from the platform herein, and such offerings may also be presented to the travelers, below.

In step 320, in certain embodiments herein, the hospitality connection platform herein may specifically determine each traveler's "likelihood to book" based on one or more specific algorithms. For instance, based on various general factors, such as demographics (age, gender, geographic region, financial stature, etc.) as well as specific individual factors (e.g., history of travel, history of searching/booking, etc.), the techniques herein may generate a "likelihood to book" rating, ranking, or score, or may simply create groups of highly-intending-to-book users (and assign users to such groups, accordingly). For example, certain users may be determined to be "window shopping" or generally browsing at all times, and don't usually book a trip except upon rare occasion (e.g., perhaps based on budget, time off, etc.). Other users, on the other hand, may enter the platform, perform a search, and book a trip by the end of the day, each time they enter the platform no matter how many times a year they perform a search. Such users, therefore, would have a higher likelihood to book that the previous users.

Many factors may be considered for the likelihood to book by a particular guest, such as how often they travel, what demographic they are in (e.g., age, income, etc.), the number of children they have, and many other influences. Time of year may also be a consideration in likelihood to book, such as whether a resort is a ski resort and the time frame being searched is winter ski season or a shoulder season where snow may or may not be sufficient, or other activities may be closed during slow tourist times. Time of year may also be an influence on the likelihood based on guest history, such as in instances where historically the user travels during peak seasons to a particular area, and is now looking at a shoulder season or off season (e.g., potentially indicative of deal searching, rather than vacation planning).

The basis for likelihood to book for a given user may also be based on specific criteria. For example, rather than merely "likely or unlikely", the techniques herein may provide additional insight, such as likelihood to book a particular type of accommodation (e.g., hotels over private home rentals, bed and breakfasts (B&B's) over hotels, etc.), likelihood to select specific deals (e.g., preferring to select options with meal packages, less likely to select options based on discounts, etc.), likelihood to select specific regions (e.g., always looking at Hawaii vacations before settling on a closer beach area), and so on. Further considerations, such as brand loyalty (e.g., prefers to book a particular hotel chain, or is specifically a member of their loyalty program, etc.), may also be considered, and those inputs to the algorithm mentioned herein are not meant to be an exhaustive list.

In step 325, particularly having the likelihood to book information from step 320, qualified resorts (e.g., approved vendors of the platform, entities meeting minimum requirement criteria of the search, etc.) may then reach out to travelers with a proposed itinerary (offerings, prices, optional customized notes/messages, etc.). That is, the hospitality connection platform herein generates qualified leads for resorts, tour operators, and other hospitality entities in response to specific requests/searches, and allows those entities to reply through the platform with their custom-tailored responses for side-by-side comparison with other competitors (assuming, that is, that any other competitors have availability meeting the search criteria). The replies may be auto-generated (e.g., standard rates, matched dates, typical package offerings), custom-auto-generated (e.g., package offerings matching the requested search), or manually entered offerings (e.g., an administrator reviewing the search request, and creating a custom-generated offering with personal note, etc.). In this manner, a back-end based collaboration between end-users and hospitality entities can be performed to present amazing vacations to the potential travelers, allowing the hospitality entities to concentrate their efforts where they have the greatest potential to result in a valuable booking, for both themselves and for the traveler.

Notably, as mentioned above, the search criteria may have a scale of desired offerings, and may include certain options that are "must have's" or "must not have's". In certain embodiments, particularly in embodiments where the search criteria results in limited (or no) results, the platform herein may allow for incomplete matches (e.g., a hotel without a pool when the search requests a pool) to include incentives that may entice a user to overcome the shortcoming (e.g., a beachfront walk-out room or a pass to a neighboring hotel with a pool).

Note further that according to embodiments herein, the hospitality connection platform herein may be based on one or both of two mechanisms: specific searching by a planning traveler, and broad searching by a potential and opportunistic traveler. For instance, while the examples above generally indicate people looking for something reasonably specific (e.g., planning a vacation/trip), other embodiments herein would allow for broader "preferences" or "opportunity-based" criteria to be entered for hospitality entities to be able to determine from time to time (e.g., based on reverse searching, availability of unused rooms nearer to the date, etc.) whether they could entice a traveler to book an opportunistic trip. As an example, assume that a user inputs a request such as "I always enjoy a lakefront trip within a 4-hour drive from my home during the summer time. I'm retired and dates are flexible, including weekdays." Any resort that has availability within that distance that meets those criteria can then reach out to the user through the platform to entice them to book that opportunistic trip, accordingly. In other words, in addition to specific searching, users may enter generally what they like and are capable of, so if a hospitality entity is looking to fill certain rooms, this user may appear on the platform (e.g., an administrator dashboard) as someone to reach out to with an offer. In this instance, likelihood to book may also be separately based on actual searching versus opportunistic searching, such as whether offers are generally accepted or ignored, what it takes to get the traveler to book an opportunistic traveler (e.g., only if the price is right, only if the weather is right, etc.), and so on. Furthermore, certain prompts based on particular users, such as anniversaries, birthdays, past travels (one time or repeated travel) may further merit reaching out (e.g., for opportunistic travelers or for unsolicited contact) to attempt to entice the traveler with a suitable package based on a theme (e.g., "Don't forget your wedding anniversary is next month! We have a room waiting for you with champagne and chocolate covered strawberries if you're free and feel like being her hero!").

In step 330, travelers may then browse through the options (e.g., traversing links to the hospitality entities' websites, viewing pictures, reading reviews, etc.), and may select, book, and subsequently take their dream trip. Travelers thus benefit not only from a dream trip, but one that took less time end energy to research and discover. Note that based on the traveler's profile information built in step 310, booking may be as simple as a single click and confirmation, if the users identity and payment information are securely stored by the hospitality connection platform herein, as the platform may pass that information on to the selected entity for booking and payment processing, accordingly.

In step 335, travelers may then share their experiences, such as through direct feedback (e.g., via the platform/application and/or the hospitality entity's own proprietary system), or as posts on social networks. Such reviews may then be used as further input to the user profile (e.g., whether they appreciated certain amenities, whether they are likely to rate well or complain, whether they are likely to re-book, etc.), and/or to the recommendation engine described herein to better pair this particular traveler or travelers in general with offerings in the future. In the event that the feedback is entered through a proprietary system (e.g., a hotel's loyalty program rather than the hospitality connection platform herein), the techniques herein may also provide for an application programming interface (API) between such systems to allow sharing of such feedback, accordingly. Note, too, that by sharing their experience throughout their social networks, users may inspire other people to take their dream trip as booked through the platform herein, further driving business through social network posts by happy guests, and that such correlations may also be tracked, potentially to offer better packages to consistent social media "influencers" to reward, and thus further incentivize, their word-of-mouth advertising within their social circles.

The simplified procedure 300a may then illustratively return to step 310, notably with the capability to continue to update traveler profiles based on the determined behavior or user modification of preferences, generate further booking connections for dream trips, and so forth. For example, when building the traveler's profile, expanded information may now include such things as determinations of what has incentivized the traveler to make certain decisions (e.g., "this traveler always seems to select the option with the free dinner," or "this traveler never books a flight with their travel", etc.), what prompted certain decisions (e.g., "the user booked immediately after seeing a golf package," or "the user booked one selection after sharing links to two options with his/her spouse", etc.). Further information may include the timing of the search (e.g., how long before travel did the dreaming begin, how long did it take before booking a particular selection, how long before the trip was the booking finally completed, how long of a trip was booked, etc.), the distance or region of the search (particularly against what the final selection was, e.g., "within 100 miles of the airport" being searched even though a traveler never or rarely selects an option further than 10 miles from the airport, etc.), and tendency toward repeat bookings (locations and/or particular entities or brands). Traveler behaviors may also be monitored and tracked, such as their search behavior (e.g., where they plan to travel, how long they've been looking at traveling, how deeply into exploring the offering's websites did they click, how much do they compare or go back to previous results, etc.), their booking behavior (e.g., what was the last page seen before a booking decision was made, whether the user looks at offerings other than hotels even when their profile does not indicate "hotels only", whether the user consistently starts with "$$$$" resorts in a first search, then books only "$" stays, etc.), their overall travel behavior (such as whether they travel seasonally and/or cyclically, e.g., a ski trip every winter, a tropical trip every winter, a lake trip every summer, traveling once a year, once every other year, etc.), and other behavior-related information that may be observed.

According to one or more other embodiments of the present disclosure, certain other operations and/or features may be included that are not specifically mentioned above. For instance, as an additional step between steps 325 and 330 above (between reaching out to the travelers and the traveler's selection/booking), techniques herein may be configured to provide for bidding-based offerings, or other back-and-forth negotiations with the end-user, where hospitality entities essentially are allowed to increase their offerings (e.g., more amenities, lower prices, better packages, etc.) to incentivize traveler selection. In one example, if a user does not make a selection within a certain amount of time, hospitality entities may provide further incentivization over time to attempt to finalize a booking. Alternatively, a user may select their "top three" choices from among a greater number of options, at which time those three finalist options may then prepare even more competitive offerings, whether based on being able to see the other finalist options or else blindly a "best and final" type of bid submission. In still another embodiment, the ability of one hospitality entity to see the offering of another hospitality entity may be based on levels of membership within the platform, such as a higher-tiered platform member being able to see (and potentially outbid) another lower-tiered platform member's offering. In a further embodiment, the user may specifically ask two or more entities for an additional offering, or a specific offering (e.g., "would you be willing to add a meal plan") in order to differentiate between two otherwise equal selections. (Or to merely get a better deal.)

Further, as a portion of reaching out to the travelers in step 325 (or otherwise), the techniques herein may allow member entities to provide offers to hold future dates based on selected criteria, when the desired dates are otherwise unavailable. For example, a hospitality entity may be able to provide an option for a traveler to select such offerings as: "Sorry, we have no vacancy during the time you're looking into, but if you would like to book now for the following year, we can offer you the following package . . . ", among other types of messages and/or notifications.

Moreover, illustratively as a portion of steps 310 and/or 315 (building a profile and/or determining a dream trip), particularly upon returning to such steps after booking and/or travel has been completed, the techniques herein may apply various machine learning and/or artificial intelligence (ML/AI) techniques to provide better preference lists and/or recommendations (to the traveler and/or the hospitality entities). For instance, recommendation engines are understood to be able to make conclusions such as "because you've stayed here, you'll like . . . " and so on. In this manner, the techniques herein may further build or refine the traveler's profile(s), or may even create the sub-profiles mentioned above (e.g., "we've created a 'traveling with children' profile for you, as your behavior is specifically tailored when your children are traveling with you"). Such recommendations may be based on a user seeming to prefer certain selections or packages, or users in general (e.g., across the platform) matching similar behaviors (e.g., "this age group typically selects this type of option, and this user falls within that age group").

Notably, various machine learning techniques may be used to generate such user preference/behavior classifications, and to place certain users in certain categories and/or classes, accordingly. For example, behavioral analytics in this manner may be based on actual activities (e.g., what was booked, what the feedback was, etc.), or based on various studies or performing "A/B testing" on guests (a technique based on providing specifically distinct options to learn more about user preferences according to their selection of option "A" versus option "B"). For instance, by walking users through a series of questions (e.g., "would you prefer this or that?" or "pick your favorite picture" or "which of the following options would you select?"), the techniques herein may generally learn the user's preferences (e.g., at the onset of user onboarding to the platform or otherwise), and may adjust them over time based on actual observations and/or changes in behavior or needs (e.g., has a child, seems to spend more or less on travel, etc.).

In one particular embodiment, machine-learning-based suggestions may be used to automatically generate offers for hospitality entities in step 325 based on this particular traveler and/or other criteria. For instance, such "auto-offers" may be generated to include certain features or amenities that have been known to trigger a booking by this traveler, such as a golf package, a food package, or a private car from the airport. Accordingly, the hospitality entities may enter a broad range of available amenities, packages, excursions, services, and price ranges, and then based on the auto-offer generation herein, the platform may specifically tailor each hospitality entity's offering (or only those with premium membership levels) to match the particular traveler. For example, assume that a hospitality entity has the following available offerings: car, food, excursions, spa, golf packages, waterfront, and discount pricing. Now, assuming a male traveler #1 is looking to book, the auto-offer may provide discount pricing and a golf package, without manual input by any administrator of the hospitality entity. Conversely, assuming that a female traveler #2 is looking to book in the same location, the auto-offer may instead provide a spa service with a waterfront room and a private car from the airport. Note that the auto-offer option herein may be based on specific selection by the traveler (e.g., "I am looking for a spa package") and/or based on user classification as mentioned above (e.g., "females in this demographic typically are looking for a spa package"). Note that step 325 "auto-offerings" may be based solely on automated suggestions, or may provide specific suggestions to an administrator to create the final presented offering.

In still another embodiment, the platform herein may be configured to inform hospitality entities generally of gleaned information (e.g., from machine learning and/or artificial intelligence) regarding the current trends or determined successful booking pathways for the population in general or various demographics (or for particular users). For instance, the techniques herein may determine overall that "travelers want food options 90% of the time" or "people prefer waterfront, and only select garden view when it comes with a food package, an excursion, or a price difference more than 20%", and so on. In this manner, the participating hospitality entities may either offer such packages through the platform, or may determine to reconfigure their internal operations to accommodate, accordingly.

In general, machine learning (ML) is concerned with the design and the development of techniques that receive empirical data as input (e.g., guest selections, activities, or other behavior monitored or determined within the platform) and recognize complex patterns in the input data (e.g., user preferences, likelihood to book, etc.). For example, some machine learning techniques use an underlying model "M", whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, the model M can be used to evaluate new data points, such as new reflection calls within the application. Often, M is a statistical model, and the cost function is inversely proportional to the likelihood of M, given the input data.

Example machine learning techniques that can be employed herein may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like.

Additionally, artificial intelligence (AI) is generally considered to be human-like intelligence exhibited by machines, rather than by humans or other animals themselves (natural intelligence, NI), where the machine perceives its environment and takes actions that maximize its chance of success at some goal. Often, the term "artificial intelligence" is applied when a machine mimics "cognitive" functions that humans associate with other human minds, such as "learning" and "problem solving". Traditional problems (or goals) of AI research include reasoning, knowledge, planning, learning, natural language processing, perception, and the ability to move and manipulate objects, while examples of capabilities generally classified as AI include successfully understanding human speech, competing at a high level in strategic game systems (such as chess and Go), autonomous cars, intelligent network routing, military simulations, and interpreting complex data.

Many tools are used in AI, including versions of search and mathematical optimization, neural networks and methods based on statistics, probability, and economics. The AI field draws upon computer science, mathematics, psychology, linguistics, philosophy, neuroscience, artificial psychology, and many others. Recently, advanced statistical techniques (e.g., "deep learning"), access to large amounts of data and faster computers, and so on, has enabled advances in machine learning and perception, increasing the abilities and applications of AI. For instance, there are many recent examples of personal assistants in smartphones or other devices, such as Ski® (by Apple Corporation), "OK Google" (by Google Inc.), Alexa (by Amazon), automated online assistants providing customer service on a web page, etc., that exhibit the increased ability of computers to interact with humans in a helpful manner.

Accordingly, as noted above, therefore, the hospitality connection platform herein may utilize certain aspects of machine learning and/or artificial intelligence (ML/AI) to perform various actions described in the present disclosure, such as, e.g., performing various recommendation actions, classifying guests based on various activities, determining a likelihood to book for certain guests (e.g., and at certain times, under certain circumstances, etc.), and so on.

As another example of the techniques of the present invention, FIG. 3B illustrates another high-level procedure for operation of a hospitality connection platform in accordance with one or more embodiments described herein. For example, a non-generic, specifically configured device may perform procedure 300b by executing stored instructions (e.g., a process, application, etc.). The procedure 300b may start at step 355, where guests build their own profile (guest profile 135), such as the names of people within their family, anniversaries and birthdays, vacation/spring break dates, preferences, and other pertinent information.

Then in step 360, the guest designs their dream trip for each vacation (e.g., freeform text and/or option selections), as described above. For example, a guest may be prompted to make a number of basic database filtering selections (e.g., a "checklist"), such as location and date, and a number of options such as pool, breakfast, golf, etc. Optionally, as an alternative or in addition to selectable options, the user may enter a freeform text description or addition to their search, such as "must have dock", if such a selection was not available in the pre-populated list of options.

In step 365, the trip request created in step 360 may then be posted to the portal, either for all hospitality entities (e.g., resorts, hotels, individuals, etc.) to see, or for a number of selected and/or filtered options only, in order to generate trip reply bids. For instance, the user may specifically select certain types of accommodations to show or not show, certain brands to show or not show, etc. Moreover, the system herein may filter out the recipients/viewers of the trip request to those having exact match to (or other percentage of) the selected options, such as not including any entities that do not have a pool if so selected. Note that in certain embodiments, rather than filtering the options, the returned results below may indicate a percent match (e.g., "80%" or "4 out of 5", etc.), or other indicator of certain selected criteria being unavailable at the particular entity (e.g., "no pool").

Note that in step 370, the system herein may also append guest data to the request showing the likelihood to book, the historical data of past vacations by the guest, and other useful information. Appending the data may be in the form of allowing the hospitality entities to access stored guest information, or by including the information in a generated report associated with the trip request. In this manner, the overall guest preferences (guest profile) is also given to the hospitality entities in order to potentially help influence their bids, or to allow an entity to decide against preparing a bid, such as where likelihood to book is low, certain preferences are unavailable at the entity, and so on. Note, too, that by providing the guest preferences/profile to the hospitality entities in advance, they are known prior to (and during) the guest's stay, which is useful for preparation, accommodation, and making the experience a memorable one for the guests.

After steps 355-370 are completed, thus once the guest's dream trip has been entered, the list of possible/matching hospitality entities is determined, and the request is sent to those possible entities (e.g., posted on a portal for, sent directly to such as via an email, and so on), then in step 375 the reply bids may be generated by the receiving hospitality entities (e.g., by an automated system, based on a manual administrator review, or a hybrid technique such as an automated filter and/or preparation with administrator review and/or adjustment). As noted above, the reply bids may be based on many factors of the specific guest and their trip request, including, but not limited to, the guest's preferences, the entities capability to meet the preferences, the entity's vacancy rates, the time of year, how close to the booking date is the request being made, and so on.

Notably, once the reply bids are generated and stored in the system, the portal may be configured to hide other bids, or may specifically be configured to show the businesses (i.e., the hospitality entities) where their bid "ranks" against others for the trip request. For example, the ranking may be based on price, matching to the guest request, likelihood to book (e.g., applying the likelihood to book computations against each bid individually, such as based on price, request match, guest history, guest demographic, entity rating overall, etc.), or any other ranking system, whether set by the system or selectable by the viewing entity. Optionally, at this time the hospitality entity may, in certain configurations, be allowed to revise their reply bid (e.g., lower the price, add incentives, offer upgrades, etc.), such as before expiration of a certain amount of time or else otherwise up until the guest makes a selection.

In step 380, through the system portal (or optionally via direct communication, such as email, text, phone calls, etc.), the guest may then receive/view the reply bids, and may have a set amount of time to select a bid prior to its expiration (e.g., a number of hours, days, etc.), so as to keep synchronized with current vacancy/inventory during the bidding process. In one embodiment, as mentioned above, the guest may request bid revisions to either all of the bid replies (e.g., "can anyone do it for less than $X"), or to selected finalists only (e.g., from entities "A-F" replying, selecting entities "A" and "C" based on their offers and asking for a "best and final" price or asking if either would be willing to provide a ride from the airport, etc.).

According to the techniques herein, once a selection is made (of a particular bid reply), the techniques herein may proceed to a booking option via the portal, where the guest information, trip request, and/or bid reply information may be used to complete the facilitated booking. Alternatively, the system herein may redirect the guest to complete the booking through an associated portal of the particularly selected hospitality entity, for instance, either passing along the guest information, trip request, and/or bid reply information to the associated portal, or other identifying information (e.g., a transaction ID) in order to ensure that the booking complies with the accepted offer.

In closing, the techniques described herein thus advantageously provide for an enhanced hospitality connection platform that connects ideal travelers to ideal experiences. For instance, the techniques herein intelligently coordinate the unique needs of individual travelers with the unique offerings of hospitality entities to not only provide better likelihood of booking, but better booking experiences overall. Searching for vacations is better, targeting guests that are likely to book is better, and travel is better on its journey from a dream to reality.

In particular, access to the hospitality connection platform's global network of high-likelihood-to-book travelers will benefit all aspects of the travel industry including resorts, tour operators, cruise lines, travel agents, RBO operators, golf courses, sports franchises, tourism commissions, wholesalers, VIP package offerors, and so forth, maximizing their revenue and reaching a global audience. Additionally, the hospitality connection platform herein provides opportunities to the travel industry to improve group-based and incentive-based travel experiences, while expanding global vacation planning, particularly for growing traveler populations in parts of the world that are dreaming about international travel experiences. Moreover, the techniques herein provide social networks the opportunity to monetize on travel by their user base through advertisement, booking commissions, etc.

Illustratively, the techniques described herein may be performed by hardware, software, and/or firmware, such as in accordance with the a specifically configured process, which may include computer executable instructions executed by a processor to perform functions relating to the techniques described herein, e.g., in conjunction with other devices which may have a correspondingly configured processes depending upon the functionality of the device, as described herein (e.g., a user device, a web server, an application server, and so on).

In particular, a computer network is a distributed collection of nodes (e.g., transmitters, receivers, transceivers, etc.) interconnected by communication links and segments for transporting signals or data between the nodes, such as personal computers, workstations, mobile devices, servers, routers, or other devices. Many types of computer networks are available, including, but not limited to, local area networks (LANs), wide area networks (WANs), cellular networks, broadband networks, infrastructure or backhaul networks, public switched telephone networks (PSTNs), and many others.

Figure 4:
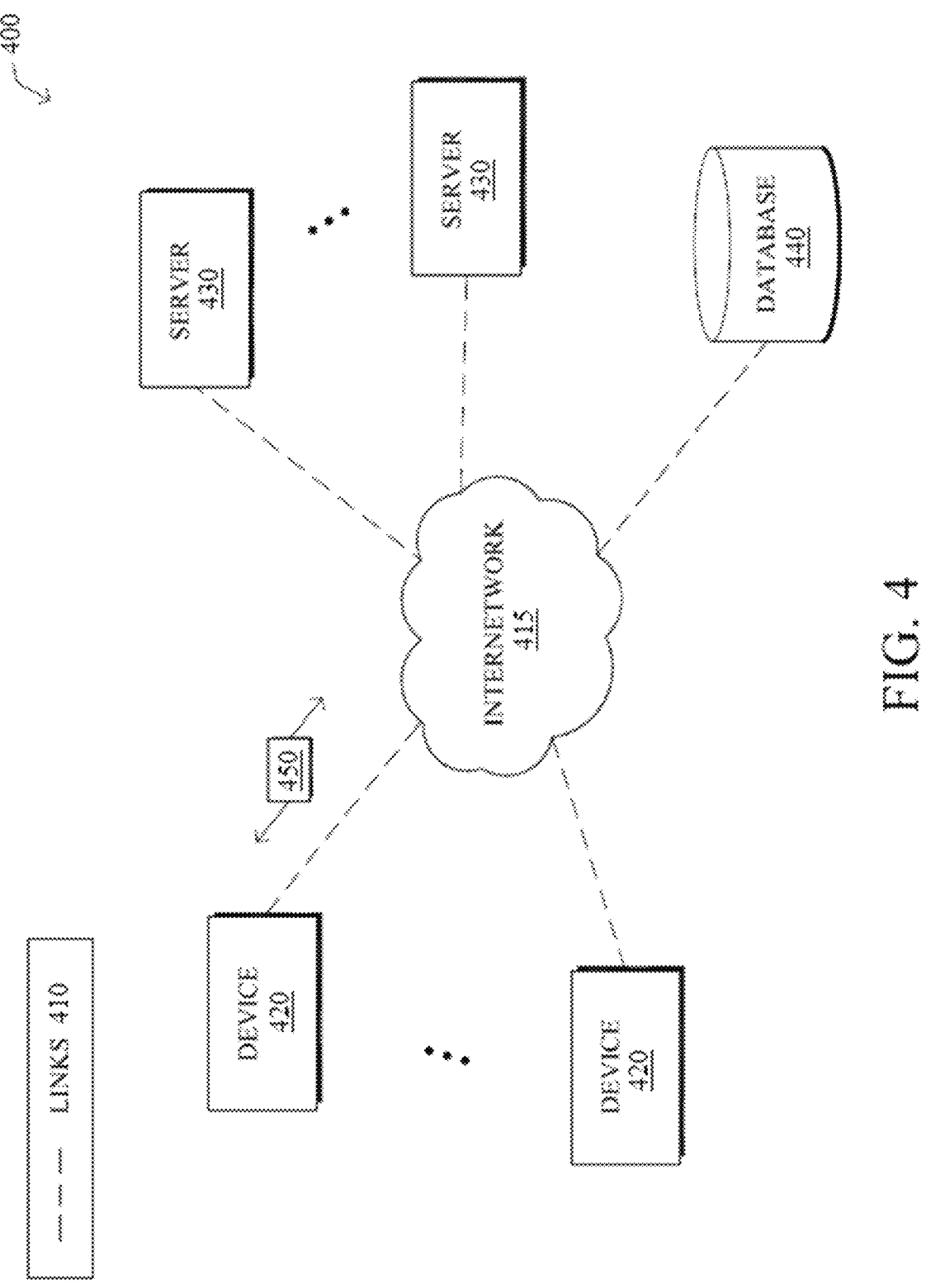
FIG. 4 illustrates an example simplified computer network.

FIG. 4 illustrates an example, and simplified, computer network 400. As shown, computer network 400 may contain various devices communicating over links 410 and an internetwork 415, such as end devices 420, servers 430, databases 440 (which may be part of servers 430 or in communication with and under the control of servers 430), and other devices as will be appreciated by those skilled in the art. Data transmissions 450 (e.g., packets, frames, messages, transmission signals, etc.) may be exchanged among the nodes/devices of the computer network 400 using predefined communication protocols where appropriate over links 410. In this context, a protocol consists of a set of rules defining how the nodes interact and exchange information with each other.

Notably, the computer network 400 may comprise various individual networks intercommunicating with each other, such as LANs, WANs, cellular/LTE networks, PSTN, and so on, and may include any number of wired or wireless links between the devices, accordingly. Note also that while links 410 are shown generically interconnecting with the internetwork 415, any number of intermediate devices (e.g., routers, switches, firewalls, etc.) may actually make up the composition of the network 400 and internetwork 415, and the view shown herein is merely a simplified illustration.

End devices 420 may comprise different types of devices, such as, e.g., personal computers, desktop computers, laptop computers, mobile devices, tablets, smartphones, wearable electronic devices (e.g., smart watches), smart televisions, set-top devices for televisions, workstations, smart vehicles, terminals, kiosks, applications running on such devices, and so on.

Servers 430 and/or databases 440 may comprise singular servers and/or databases, server and/or database farms, cloud-based server and/or database services, network attached storage (SAN), and any other type or configuration of computing devices that provides computing and/or storage services as will be appreciated by those skilled in the art. Servers 430 and/or databases 440 may be centralized (i.e., processing and/or storage occurring on a single device or within a single location of devices) or distributed/decentralized (i.e., processing and/or storage occurring across multiple devices or across a plurality of locations). Notably, for example, servers 430 and/or databases 440 may be deployed on the premises of an enterprise or may be cloud-based.

Figure 5:
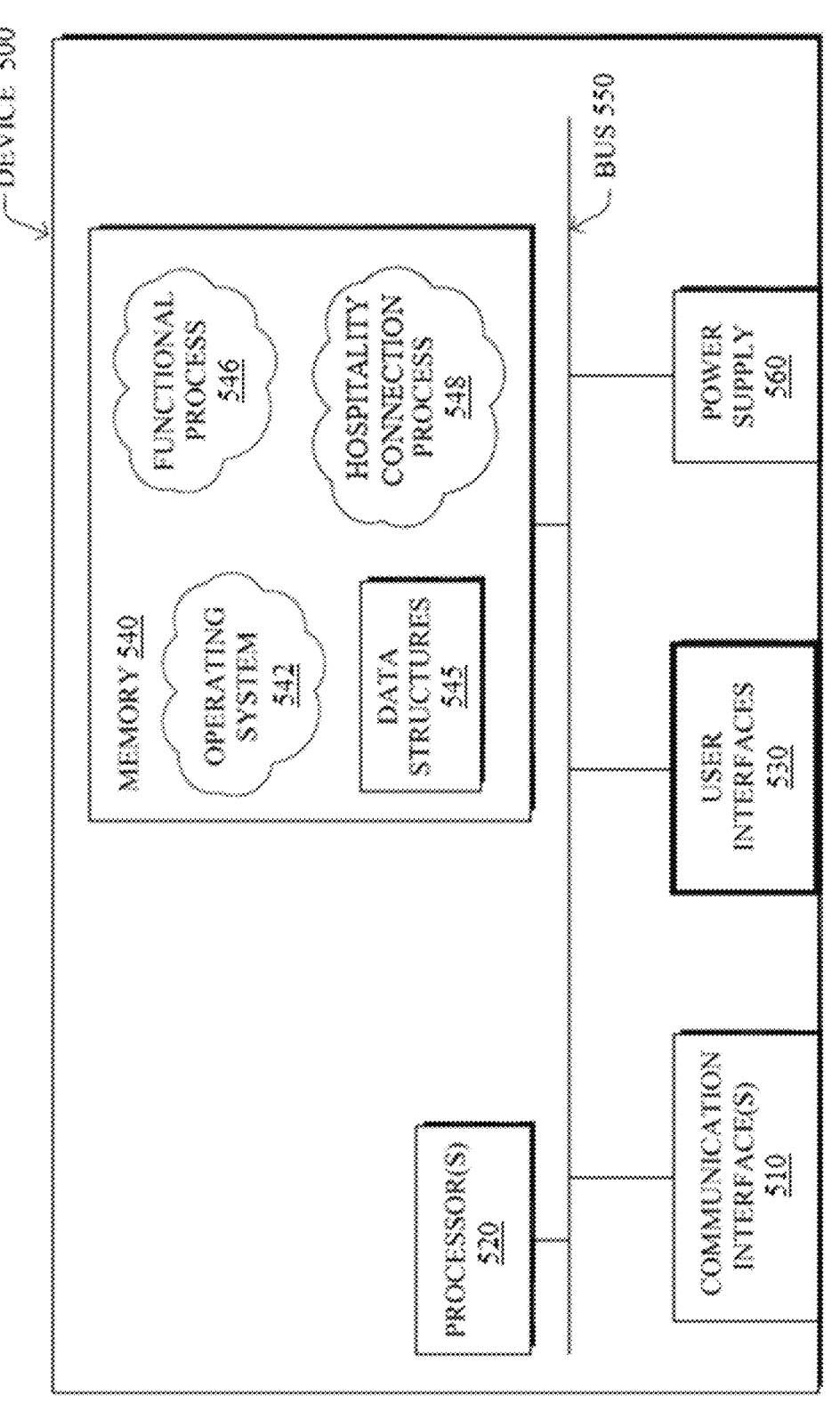
FIG. 5 illustrates an example of a computing device.

FIG. 5 is a simplified schematic block diagram of an example computing device 500 that may be used with one or more embodiments described herein (e.g., end device 420, sever 430, database 440, etc.). Illustratively, device 500 may generally include one or more communication interfaces 510, one or more processors 520, and a memory 540 interconnected by a system bus 550 or other dedicated circuitry, and is powered by a power supply system 560. Additionally, the device 500, where required, may comprise one or more user interfaces 530 configured to solicit and receive user input (input/output or "I/O" components, such as displays, keyboards, touchscreens, biometrics, and so on).

The communication interfaces 510 include the mechanical, electrical, and signaling circuitry for communicating data over wired and/or wireless links of a communication network.

The memory 540 includes a plurality of storage locations that are addressable by the processor(s) 520 for storing software programs and data structures associated with the embodiments described herein. The processor(s) 520 may comprise necessary elements or logic adapted to execute the software programs and manipulate the data structures 545. An operating system 542, portions of which are typically resident in memory 540 and executed by the processor(s) 520, functionally organizes the device by, among other things, invoking operations in support of software processors and/or services executing on the device. Illustratively, these software processes and/or services may include one or more functional processes 546 (e.g., specific to functionality of the device), and an example "hospitality connection" process 548 that is configured to perform one or more of the operations described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Figure 6:
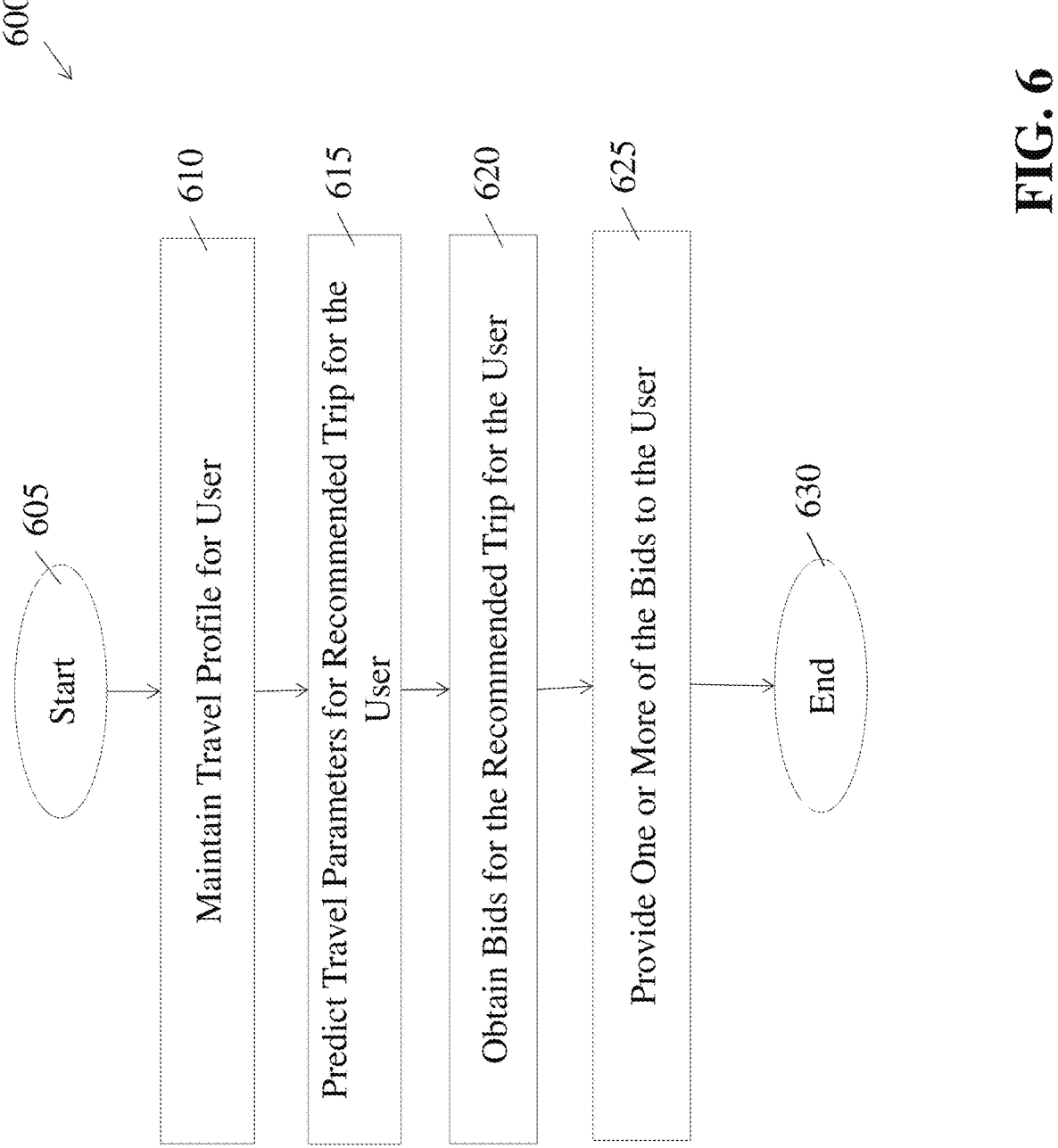
FIG. 6 illustrates an example simplified procedure for a hospitality connection platform in accordance with one or more embodiments described herein.

In closing, FIG. 6 illustrates an example simplified procedure for a hospitality connection platform in accordance with one or more embodiments described herein. For example, a non-generic, specifically configured device (e.g., device 200, particularly a monitoring device) may perform procedure 600 by executing stored instructions (e.g., process 248). The procedure 600 may start at step 605, and continues to step 610, where, as described in greater detail above, a device of a hospitality connection service may maintain a traveler profile for a user that comprises travel preferences and travel history data for that user. In an embodiment, the traveler profile for the user may be determined based on personal preferences, birthdays, anniversaries, holiday dates, statistics, demographics, personal, or allergies of the user. In one or more embodiments, the travel preferences may comprise types of preferred vacations or activities, average budgets, loyalty reward program status, or restrictions of the user At step 615, as detailed above, the device may predict, based on the traveler profile, trip parameters for a recommended trip for the user and an associated likelihood of the user booking the recommended trip. In one embodiment, the trip parameters may comprise as desired locations, dates, activities, accommodation types, or itinerary styles. In one or more embodiments, the associated likelihood of the user booking the recommended trip to the plurality of systems may be determined based on a plurality of criteria associated with interaction of the user with the hospitality connection service At step 620, the device may obtain bids from a plurality of systems associated with potential destinations for the recommended trip for the user, in part by sending the trip parameters for the recommended trip and the associated likelihood of the user booking the recommended trip to the plurality of systems. In one or more embodiments, the potential destinations may comprise hotel properties, private rentals, hostels, motels, or resorts. In an embodiment, the bids from the plurality of systems associated with the potential destinations for the recommended trip for the user may each be bound by an associated expiration timer At step 625, as detailed above, the device may provide one or more of the bids from the plurality of systems associated with the potential destinations for display to the user. In one or more embodiments, the one or more of the bids from the plurality of systems associated with the potential destinations that are provided for the display to the user may be selected based on a degree to which a given bid matches the recommended trip.

The simplified procedure 600 may then end in step 630, notably with the ability to continue providing a user with trip recommendations that are, by the device, catered and selected to the user's individual tastes and desires. Other steps may also be included generally within procedure 600. For example, such steps (or, more generally, such additions to steps already specifically illustrated above), may include: causing, by the device, the recommended trip for the user to be booked with a system of the plurality of systems associated with the potential destinations; obtaining, by the device, feedback regarding the recommended trip for the user, and updating, by the device and based on the feedback, the traveler profile for the user; and so on.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for a hospitality connection platform. In particular, the techniques herein provide a hospitality connection platform that connects the travel consumer with resorts, hotels, vacation rentals, and destinations in a manner in which the power and control is in the hands of both parties as they collaborate to create the dream experience. That is, the techniques herein enable creation a direct connection between travelers who are highly likely to book and sellers looking to fill vacancies.

Illustratively, the techniques described herein may be performed by hardware, software, and/or firmware, such as in accordance with the illustrative hospitality connection process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the process 248.

While there have been shown and described illustrative embodiments, it is to be understood that various other adaptations and modifications may be made within the scope of the embodiments herein. For example, while certain types of hospitality entities have been described, or certain amenities, offerings, activities, deals, and so on have been specifically mentioned herein, those skilled in the art will recognize that the hospitality connection platform described herein is not so limited, and that other entities, offerings, etc. may be used in accordance with the techniques described herein, and those specifically mentioned are merely examples not meant to limit the scope of the present disclosure. Also, while certain protocols, device types, and configurations may have been illustrated above, others may also be used as appropriate, accordingly.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by an application," those skilled in the art will appreciate that portions of the platform herein may be considered to be extensions of the server operation performed by the application, or extensions of the application operation performed by the server, and as such, any process step "performed by" one process or another need not be limited to local processing on a specific device, unless otherwise specifically noted as such. Furthermore, while certain aspects are described as being performed "by a process" or by particular types of components, the techniques may be generally applied to any suitable software/hardware configuration as part of an apparatus or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

In particular, it should be noted that the steps shown and described in the procedures herein are merely examples for illustration, and certain other steps may be included or excluded as desired. For instance, other steps may also be included generally within procedures above as described herein. For example, such steps (whether additional steps or furtherance of steps already specifically illustrated above) may include such things as: comparing and classifying guests, updating profiles or offerings, providing bidding-based offerings, performing "A/B testing" on guests, and so on. Further, while a particular order of the steps is shown, this ordering is merely illustrative, and any suitable arrangement of the steps may be utilized without departing from the scope of the embodiments herein. Also, while procedures may be described separately, certain steps from each procedure may be incorporated into each other procedure, and the procedures are not meant to be mutually exclusive.

The foregoing description has been directed to specific embodiments. It will be apparent, however, that other variations and modifications may be made to the described embodiments, with the attainment of some or all of their advantages. For instance, it is expressly contemplated that certain components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:

maintaining, by a device of a hospitality connection platform executed on a non-generic, specifically configured server, a traveler profile for a user, the traveler profile comprising structured travel preference data and tracked travel behavior history for the user;

generating, by the device, a machine-learned predictive model for the user based on the structured travel preference data and the tracked travel behavior history;

predicting, by the device using the machine-learned predictive model, predicted trip parameters for a recommended trip for the user and an associated likelihood score of the user booking the recommended trip;

sending, by the device, the predicted trip parameters and the associated likelihood score to a plurality of bidding systems, each of the plurality of bidding systems associated with a different hospitality entity;

obtaining, by the device, responsive bids from the plurality of bidding systems, wherein each responsive bid is generated based at least in part on the predicted trip parameters and the associated likelihood score; and providing, by the device, a user interface configured to display the responsive bids along with tailored details of each bid as generated by each different hospitality entity for the user.

2. The method as in claim 1, wherein the traveler profile for the user is determined based on personal preferences, birthdays, anniversaries, holiday dates, statistics, demographics, personal, or allergies of the user.

3. The method as in claim 1, wherein the structured travel preference data comprise types of preferred vacations or activities, average budgets, loyalty reward program status, or restrictions of the user.

4. The method as in claim 1, wherein the predicted trip parameters comprise as desired locations, dates, activities, accommodation types, or itinerary styles.

5. The method as in claim 1, wherein the responsive bids comprise potential destinations selected from hotel properties, private rentals, hostels, motels, or resorts.

6. The method as in claim 1, further comprising:

causing, by the device, the recommended trip for the user to be booked with a system of a selected hospitality entity.

7. The method as in claim 1, further comprising:

obtaining, by the device, feedback regarding the recommended trip for the user; and updating, by the device and based on the feedback, the traveler profile for the user.

8. The method as in claim 1, wherein the responsive bids are each bound by an associated expiration timer.

9. The method as in claim 1, wherein the responsive bids that are provided are filtered based on a degree to which a given bid matches the recommended trip.

10. The method as in claim 1, wherein the associated likelihood score of the user booking the recommended trip is determined based on a plurality of criteria associated with interaction of the user with the hospitality connection platform.

11. A tangible, non-transitory, computer-readable medium having computer-executable instructions stored thereon that, when executed by a processor on a device of a hospitality connection platform executed on a non-generic, specifically configured server, cause the device to perform a method comprising:

maintaining a traveler profile for a user, the traveler profile comprising structured travel preference data and tracked travel behavior history for the user;

generating a machine-learned predictive model for the user based on the structured travel preference data and the tracked travel behavior history;

predicting, using the machine-learned predictive model, predicted trip parameters for a recommended trip for the user and an associated likelihood score of the user booking the recommended trip;

sending the predicted trip parameters and the associated likelihood score to a plurality of bidding systems, each of the plurality of bidding systems associated with a different hospitality entity;

obtaining responsive bids from the plurality of bidding systems, wherein each responsive bid is generated based at least in part on the predicted trip parameters and the associated likelihood score; and providing a user interface configured to display the responsive bids along with tailored details of each bid as generated by each different hospitality entity for the user.

12. The tangible, non-transitory, computer-readable medium as in claim 11, wherein the traveler profile for the user is determined based on personal preferences, birthdays, anniversaries, holiday dates, statistics, demographics, personal, or allergies of the user.

13. The tangible, non-transitory, computer-readable medium as in claim 11, wherein the structured travel preference data comprise types of preferred vacations or activities, average budgets, loyalty reward program status, or restrictions of the user.

14. The tangible, non-transitory, computer-readable medium as in claim 11, wherein the predicted trip parameters comprise as desired locations, dates, activities, accommodation types, or itinerary styles.

15. The tangible, non-transitory, computer-readable medium as in claim 11, wherein the responsive bids comprise potential destinations selected from hotel properties, private rentals, hostels, motels, or resorts.

16. The tangible, non-transitory, computer-readable medium as in claim 11, the method further comprising:

causing the recommended trip for the user to be booked with a system of a selected hospitality entity.

17. The tangible, non-transitory, computer-readable medium as in claim 11, the method further comprising:

obtaining feedback regarding the recommended trip for the user; and updating, based on the feedback, the traveler profile for the user.

18. The tangible, non-transitory, computer-readable medium as in claim 11, wherein the responsive bids are each bound by an associated expiration timer.

19. The tangible, non-transitory, computer-readable medium as in claim 11, wherein the responsive bids that are provided are filtered based on a degree to which a given bid matches the recommended trip.

20. An apparatus, comprising:

one or more network interfaces to communicate with a network;

a processor coupled to the one or more network interfaces and configured to execute one or more processes; and a memory configured to store a process that is executable by the processor, the process, when executed by a hospitality connection platform executed on a non-generic, specifically configured server, configured to:

maintain a traveler profile for a user, the traveler profile comprising structured travel preference data and tracked travel behavior history for the user;

generate a machine-learned predictive model for the user based on the structured travel preference data and the tracked travel behavior history;

predict, using the machine-learned predictive model, predicted trip parameters for a recommended trip for the user and an associated likelihood score of the user booking the recommended trip;

send the predicted trip parameters and the associated likelihood score to a plurality of bidding systems, each of the plurality of bidding systems associated with a different hospitality entity;

obtain responsive bids from the plurality of bidding systems, wherein each responsive bid is generated based at least in part on the predicted trip parameters and the associated likelihood score; and provide a user interface configured to display the responsive bids along with tailored details of each bid as generated by each different hospitality entity for the user.

\* \* \* \* \*